United States Patent
Makhov et al.

(10) Patent No.: US 10,509,704 B2
(45) Date of Patent: Dec. 17, 2019

(54) SYSTEM AND METHOD FOR AUTOMATIC DATA BACKUP BASED ON MULTI-FACTOR ENVIRONMENT MONITORING

(71) Applicant: Acronis International GmbH, Schaffhausen (CH)

(72) Inventors: Alexey Makhov, Moscow (RU); Stanislav Protasov, Moscow (RU); Serguei M. Beloussov, Singapore (SG); Andrey Polevoy, Khimki (RU)

(73) Assignee: Acronis International GmbH, Schaffhausen (CH)

( * ) Notice: Subject to any disclaimer, the term of this patent is extended or adjusted under 35 U.S.C. 154(b) by 650 days.

(21) Appl. No.: 15/245,359

(22) Filed: Aug. 24, 2016

(65) Prior Publication Data

US 2017/0060694 A1 Mar. 2, 2017

Related U.S. Application Data

(60) Provisional application No. 62/208,982, filed on Aug. 24, 2015.

(51) Int. Cl.
| | |
|---|---|
| *G06F 17/30* | (2006.01) |
| *G06F 11/14* | (2006.01) |
| *G06F 16/11* | (2019.01) |
| *G06F 16/27* | (2019.01) |
| *G06F 16/23* | (2019.01) |
| *G06F 16/21* | (2019.01) |

(Continued)

(52) U.S. Cl.
CPC ........ *G06F 11/1461* (2013.01); *G06F 16/113* (2019.01); *G06F 11/3058* (2013.01); *G06F 16/1734* (2019.01); *G06F 16/219* (2019.01); *G06F 16/2358* (2019.01); *G06F 16/27* (2019.01)

(58) Field of Classification Search
CPC ............. G06F 11/1461; G06F 11/1464; G06F 11/1469; G06F 11/1451; G06F 11/1458; G06F 16/113; G06F 16/1734; G06F 16/219; G06F 16/2358; G06F 16/27
USPC ....... 707/646, 645, 640, 644, 647, 649, 650, 707/653
See application file for complete search history.

(56) References Cited

U.S. PATENT DOCUMENTS

| | | | | |
|---|---|---|---|---|
| 8,713,376 | B1 * | 4/2014 | Makin ................ | G06F 11/1451 707/654 |
| 9,529,815 | B1 * | 12/2016 | Garg .................. | G06F 16/1734 |

(Continued)

*Primary Examiner* — Dangelino N Gortayo
(74) *Attorney, Agent, or Firm* — Arent Fox LLP; Michael Fainberg (57) ABSTRACT

Disclosed are systems, methods and computer program products for automatic data backup based on multi-factor environment monitoring. An example method includes monitoring an occurrence of one or more danger events; detecting when a danger event occurs or about to occur; determining a danger level of the detected danger event; determining an importance level of each of a plurality of backup data items; determining a backup time for performing backup of the backup data items based on the determined danger level of detected danger event; determining a backup order of the plurality of backup data items based on the determined importance level of the backup data items; selecting a backup storage for the backup data items and performing a backup of the plurality of backup data items to the selected backup storage.

14 Claims, 5 Drawing Sheets

(51) Int. Cl.
*G06F 16/17* (2019.01)
*G06F 11/30* (2006.01)

(56) References Cited

U.S. PATENT DOCUMENTS

| | | | |
|---|---|---|---|
| 2007/0174692 A1* | 7/2007 | Nagasawa | G06F 11/1451 714/13 |
| 2010/0280999 A1* | 11/2010 | Atluri | G06F 11/1471 707/657 |
| 2012/0089572 A1* | 4/2012 | Raichstein | G06F 16/174 707/645 |
| 2013/0212422 A1* | 8/2013 | Bauer | H04L 67/1097 714/4.1 |
| 2014/0279922 A1* | 9/2014 | Kottomtharayil | G06F 9/505 707/654 |
| 2016/0048408 A1* | 2/2016 | Madhu | G06F 11/1458 718/1 |
| 2016/0098309 A1* | 4/2016 | Kim | G06F 11/0709 714/47.1 |

\* cited by examiner

SYSTEM AND METHOD FOR AUTOMATIC DATA BACKUP BASED ON MULTI-FACTOR ENVIRONMENT MONITORING

CROSS-REFERENCE TO RELATED APPLICATIONS

This application claims priority to U.S. Patent Provisional Application Ser. No. 62/208,982, filed Aug. 24, 2015, the entire contents of which being incorporated herein by reference into the present application.

TECHNICAL FIELD

The disclosure relates generally to the field of data backup, and more specifically to the systems, methods and computer program products for automatic data backup based on multi-factor environment monitoring.

BACKGROUND

Modern corporate enterprises have large volumes of critical data, such as work documents, emails, financial records, etc., that requires backup to prevent data loss. During a typical backup procedure, data stored on client workstations and servers in the enterprise network is sent to a backup storage site (e.g., a data center). Since the amount of data that needs to be backed up can be very large, which is even for a medium-size company can be measured in hundreds of terabytes, the backup process can be very resource intensive and time-consuming. Furthermore, provided that data backup has to be performed frequently, e.g., daily, semi-weekly, the backup process can be quite onerous on the corporate network and computer infrastructure.

However, even frequent data backups cannot fully protect companies from data loss caused by unforeseen events, such as power outages and earthquakes, which can disable client computers and servers, and cause loss of critical data. Typically, during such emergencies, backup systems try to backup all data even if there is a lot of it. Backup destinations are typically selected based on storage parameters, such as its cost or reliability, not taking into account the importance of the source data. And system administrators, responsible for the backup system, must make important and complex decisions regarding backup of critical data under pressure of imminent data loss. Therefore, there is a need for an automated backup system that can be more effective and efficient in handling data backup during emergencies.

SUMMARY OF THE DISCLOSURE

Accordingly, the present disclosure provides systems, methods and computer program products for automatic data backup based on multi-factor environment monitoring, which reduce or address the disadvantages of conventional systems identified above in addition to providing other useful benefits. In a general aspect, the disclosed backup management system monitors one or more danger factors, e.g., environmental dangers such as blackouts in the building or earthquakes. When a monitored event occurs, the system may be configured to arrange for a data backup according to data priority rules and to proceed to automatically back up the selected data to a backup storage location appropriate for the event that occurred. In other words, implementations of a backup system according to this general aspect protect a user's data according to its priority and based on the knowledge on current danger level and available backup storages specifics.

One of the advantages of this backup management system is that it quickly addresses the complex problem of prioritizing data that should be backed up and selecting an appropriate backup location in view of the particular emergency or event that has been detected. During an emergency, one would reasonably expect that it would be difficult, if not impossible, for a human to efficiently prioritize and carry out a similar plan of action for data backup. Moreover, in emergencies where time is of the essence (e.g., a fire in an office containing a critical server), an efficient computer-based system for prioritized data backup is particularly useful compared to more conventional methods.

In a first general aspect, a method for performing data backup may include: monitoring for an occurrence of one or more danger events; detecting when a danger event occurs or is about to occur; determining a danger level of the detected danger event; determining an importance level of each of a plurality of backup data items; determining a backup time for performing a backup of the backup data items based on the determined danger level of detected danger event; determining a backup order of the plurality of backup data items based on the determined importance level of the backup data items; selecting a backup storage for the backup data items based on the danger level of the danger event and the importance level of the backup data item; and performing a backup of the plurality of backup data items to the selected backup storage in the determined backup order and at the determined backup time.

In an alternative aspect of the method, the danger event is selected from a plurality of danger events including local danger events and global danger events.

In an alternative aspect of the method, determining a backup time further includes:

determining when a scheduled backup time occurs.

In an alternative aspect of the method, determining a backup time further includes: determining to perform backup at the scheduled backup time in a case of low danger event; and determining to perform an immediate backup in a case of a high danger event.

In an alternative aspect, the method further includes, generating a queue of backup data items based on the determined backup time and the backup order of the plurality of backup data items.

In an alternative aspect, the method further includes, generating a backup job for each backup data item in the queue based on the selected backup storage for said backup data item.

In an alternative aspect of the method, the importance level of each of the plurality of backup data items is based at least in part on the file type or metadata of the backup data item.

In an alternative aspect of the method, the backup storage for the backup data items is selected at least in part based upon geographic proximity to the computer containing the backup data items.

In a second general aspect, a system is disclosed for performing data backup. According to this aspect, the system includes a processor configured to monitor for an occurrence of one or more danger events; detect when a danger event occurs or about to occur; determine a danger level of the detected danger event; determine an importance level of each of a plurality of backup data items; determine a backup time for performing a backup of the backup data items based on the determined danger level of detected danger event; determine a backup order of the plurality of backup data items based on the determined importance level of the backup data items; select a backup storage for the backup data items based on the danger level of the danger event and the importance level of the backup data item; and perform a backup of the plurality of backup data items to the selected backup storage in the determined backup order and at the determined backup time.

In alternative aspects, the system may include a processor configured to perform any of the methods disclosed herein.

In a third general aspect, a non-transitory computer readable medium storing computer executable instructions is disclosed for performing data backup. According to this aspect, instructions are included for monitoring for an occurrence of one or more danger events; detecting when a danger event occurs or about to occur; determining a danger level of the detected danger event; determining an importance level of each of a plurality of backup data items; determining a backup time for performing a backup of the backup data items based on the determined danger level of detected danger event; determining a backup order of the plurality of backup data items based on the determined importance level of the backup data items; selecting a backup storage for the backup data items based on the danger level of the danger event and the importance level of the backup data item; and performing a backup of the plurality of backup data items to the selected backup storage in the determined backup order and at the determined backup time.

In alternative aspects, the non-transitory computer readable medium may include instructions for carrying out any of the methods disclosed herein.

The above simplified summary of exemplary aspects serves to provide a basic understanding of the present disclosure. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the disclosure that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more exemplary aspects of the disclosure and, together with the detailed description, serve to explain their principles and implementations.

DETAILED DESCRIPTION

Exemplary aspects of the present disclosure are described herein in the context of systems, methods, and computer program products for automatic data backup based on multi-factor environment monitoring. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same items.

Figure 1:
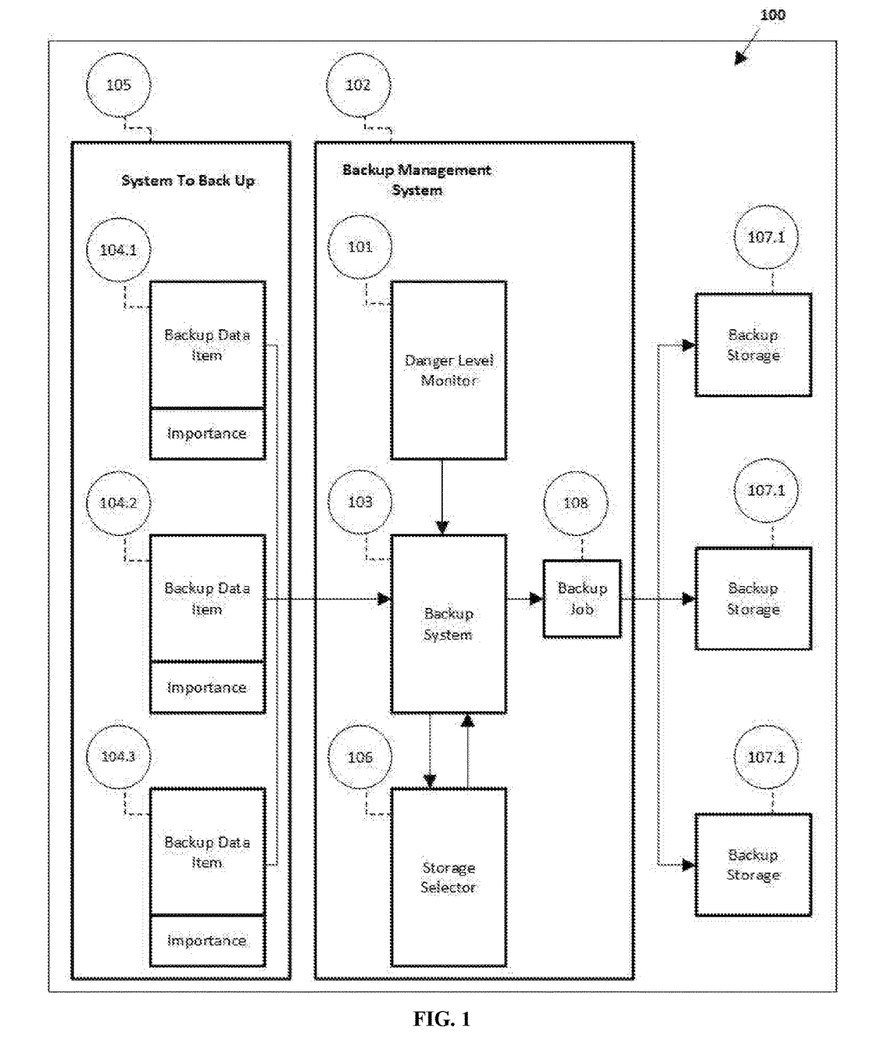
FIG. 1 is a block diagram illustrating an example configuration of a system for automatic data backup based on multi-factor environment monitoring.

FIG. 1 depicts an exemplary configuration of a system 100 for automatic data backup based on multi-factor environment monitoring. In a general aspect, the system 100 includes a plurality of software and/or hardware components that may be deployed, at least partially, on one or more personal computers or servers in a corporate or home network. In one exemplary aspect, the system 100 includes, but is not limited to, a Danger Level Monitor 101, a Backup Management System 102, a Backup System 103, a Backup Data Item (backup agent or backup application) 104, one or more Systems to Back Up 105, a Storage Selector 106, one or more Backup Storages 107, and one or more Backup Job 108.

In one exemplary aspect, the system 100 may operate in the following manner: a system administrator of a corporate network (not shown) may specify different danger events that the Backup Management System 102 needs to monitor. In addition, the system administrator may specify a Backup Data Item Importance Level for different Backup Data Items (e.g., 104.1, 104.2, 104.3). Moreover, the system administrator may also specify a time schedule for data backup. Danger Level Monitor 101, which is a module of the Backup Management System 102, begins monitoring for a plurality of danger events specified by the system administrator, as well as the specified backup time schedule. When one or more specified danger events occurs (or are about to occur) or a scheduled time comes, Danger Level Monitor 101 notifies a Backup System 103 (e.g., Acronis® Backup) to initiate a backup with information about the Danger Level. In response, Backup System 103 creates a queue of Backup Data Items (e.g., 104.1, 104.2, 104.3) stored on a System To Back Up 105 (e.g., client computer or document server), based on the Danger Level and Backup Data Item Importance Level. Backup System 103 requests a Storage Selector 106 to define, which Storages 107.1, 107.2, 107.3 should be used to back up each Backup Data Item 104.1, 104.2, 104.3, based on the Danger Level and Backup Data Item Importance Level. The Backup Management System 102 creates and executes a Backup Job 108, which backs up Backup Data Items 104.1, 104.2, 104.3 according to the queue order to one or more of the selected Backup Storages 107.1, 107.2, 107.3 (e.g., remote backup storage or third-party cloud storage).

In one exemplary aspect, Danger Level Monitor 101 monitors a danger level of events affecting the corporate computer network. The danger level monitoring results may be used to predict the negative consequences of not having a backup in the right place by notifying a Backup System 103 of the need to perform a backup as soon as possible.

In various aspects, Danger Level Monitor 101 may monitor the following danger events: local danger events (such as a high temperature in the local datacenter, a blackout in the building, fire alarms, etc.), and global danger events (such as power outages, earthquakes, hurricanes, floods, etc.). The information about local danger events may be obtained from building management companies, temperature sensors, humidity or flood sensors, fire sensors, seismic detectors, or other sources. The information about global danger events may be obtained from the internet, weather monitoring services, local and national emergency alert systems, and other sources. In some aspects, information about local and global danger events may be completely or partially obtained from one or more internet-based sources. For example, in some aspects the Danger Level Monitor 101 may be configured to connect to one or more servers configured to provide status information regarding current or potential dangers. In some aspects, one or more of the types of danger event or sources of information about danger events may be prioritized.

In one aspect, there may be two or more Danger Levels. For example, building fires, significant earthquakes, and strong hurricanes may be designated as events of high danger level, because they can irreparably damage network and computer infrastructure of the corporate enterprise, which may cause irreplaceable loss of critical data. In another aspect, temporary blackouts and weak earthquakes, hurricanes and floods, may be designated as events of low danger level, because they typically would not cause permanent and irreversible damage to corporate computers, and thus will not result in the loss of critical data.

In one exemplary aspect, the danger level of different events may depend on the location of the corporate enterprise or the computer storing the Backup Data Items. If a company building is located in the Caribbean islands, which are prone to hurricanes and heavy flooding, then these types of events may have higher danger level than earthquakes, which are rare for that particular region. However, if a company is located in California, which is known for frequent and strong earthquakes and wild fires, and less so for hurricanes and flooding, then earthquakes and/or fires may have higher danger level than other types of emergency events. Likewise, if a company is located in the mid-western United States, which is known for dangerous tornados, then tornados may have higher danger level.

In some aspects the Danger Level Monitor 101 may use an algorithm to perform a more complex danger level calculation. In some aspects, the danger level associated with a particular type of event may be assigned based upon an algorithm that takes into account event-related data (e.g., daily temperatures, tornado tracking or frequency data, historical flood data) in order to generate and assign a danger level. For example, historical daily temperature and blackout data might suggest that a blackout or server overheating may be more likely on a particular summer day due to excessive electricity usage in a region. As such, the Danger Level Monitor 101 may then assign an elevated danger level for these events on that date. Other historical environmental at may also be used, e.g., flood or rainfall data, and hurricane/tornado frequency or tracking data. The Danger Level Monitor 101 may be configured to receive historical (or other datasets) or to store contemporaneous data that it receives in memory so that trends can be calculated. The danger level calculation may apply any known statistical or mathematical analyses to generate danger levels for the monitored events. In select aspects, the Danger Level Monitor 101 may be configured to receive user input, a configuration file or policy that establishes danger levels for one or more monitored events or which overrides a calculated danger level.

In select aspects the Danger Level Monitor 101 and/or the Backup Management System may be configured to communicate with one or more other Danger Level Monitor 101 units. For example, Danger Level Monitor 101 units associated with two or more separate Backup Management Systems in the same building, campus, or region may communicate with each other to share information about dangerous events that may be in progress or predicted. For example, a first Danger Level Monitor 101 may detect a fire in a server room and alert a second other Danger Level Monitor 101 associated with a separate Backup Management System in the same building. Communication between Danger Level Monitor 101 units or Backup Management Systems may take place using a wired, wireless, cellular or other communication network. Moreover, there is no limit to the geographic distance that may be present between two units or systems (e.g., in the case of a hurricane or tornado, an alert from a geographically distant unit or system may be useful). A Danger Level Monitor 101 unit may be configured to modify a calculated or assigned danger level based upon data received from another unit. Similarly, in some aspects the Danger Level Monitor 101 may be configured to poll multiple units (e.g., connected via a local network) in order to arrive at a consensus danger level for a given monitored event. The frequency of danger level determination, adjustment, or polling may vary based upon a given user or enterprise's need for data backup integrity.

In some aspects, the Danger Level Monitor 101 can be configured to alert a user about the current danger level status or pertinent danger level changes, in addition to functioning as a monitor for backup purposes. The alert may consist of a prompt on a user's computer system or a communication sent to a preset email address or telephone number. The Danger Level Monitor 101 may be configured to receive a user response to an alert or to otherwise receive user input (e.g., from a connected terminal) that modifies the current danger level of one or more monitored events.

Backup based on Danger Levels may be performed in different ways, for example:
1. A Simple Configuration:
   i. Trigger backup on schedule—with Low Danger Level
   ii. Trigger immediate backup on some event—with High Danger Level According to this configuration, backup will periodically occur on preset schedule (e.g., nightly) when a low danger level is detected. However, when a high danger level (local or global) is detected based upon one or more monitored events, the system will initiate an immediate backup.

2. A More Complex Configuration:
   i. Trigger backup on schedule—with Low Danger Level
   ii. Trigger immediate backup on some local event—with Normal Danger Level
   iii. Trigger immediate backup on some global event—with High Danger Level According to this configuration, a backup will periodically occur on a preset schedule (e.g., nightly) when a low danger level is detected. However, when monitoring detects a normal danger level local event, the system will initiate an immediate backup. Similarly, when monitoring detects a high danger level global event, the system will also initiate an immediate backup As illustrated by the preceding paragraphs, configurations may be implemented that initiate a scheduled or immediate backup based upon any single or set of monitored events. The triggering condition is purely discretional as to the user or enterprise and may take into account any parameters discussed herein, alone or in combination. For further clarification, see also FIG. 4, which illustrates this configuration.

In one exemplary aspect, the Backup Management System 102 is configured to define a Backup Data Item Importance Level. Backup data items may include one or more files, an entire hard drive of a computer, or all files stored on a workstation or a server. In some aspects, backup data items may be limited by a user or policy in effect to a particular file extension, type, or files that satisfy a given attribute (e.g., PDFs, Excel files, Word documents, executable files, files with a creation or last edited date within a given range). A Backup data Item Importance Level parameter may be implemented to specify how important the backup data item is and as a result, which backup data items have backup priority over other backup data items.

There may be two or more Backup Data Item Importance Levels.

Backup Data Item Importance Level may be defined in several ways:

1. By manually specifying an Importance Level for every Backup Data Item. For example, Server 1 and Server 2 have High Importance, Server 2 and Server 3 have Normal Importance.

2. By manually specifying an Importance Level for Data Item types: In one example, servers have High Importance and workstations have Normal Importance. In another example, documents have High Importance and music files have Normal Importance. In another example, files may be prioritized based upon metadata, e.g., the file creation or modification date, an owner attribute associated with the file, or any other metadata tag or classification attribute.

3. By using any existing formal classification. For example, based on Government Security Classifications Policy: Top Secret documents have High Importance, Secret documents Normal Importance, Official documents have Low Importance.

In a general aspect, based on the determined Backup Data Item Importance Level for a plurality of Backup Data Items, the Backup System 103 determines the priorities of the data backup items and the order in which they should be backed up. Based on the determined Danger Level of the detected danger event, the Backup System 103 determines the time for performing backup of the data items. And based on the time of backup information and the order of backup data items information, the Backup System 103 creates a queue of Backup Data Items for backup to a backup storage.

In one exemplary aspect, the Storage Selector 106 of the Backup Management System 102 is configured to choose a Backup Storage for storing Backup Data Items. The chosen Backup Storage may be selected from a plurality of local and/or remote Backup Storage units or locations. In many aspects, the Backup Storage will be a remote storage location (e.g., a distant data center). The appropriate Backup Storage may be selected based on the Danger Level and/or the Data Importance Level. In many aspects, the appropriate Backup Storage will be selected based on a combination of these two parameters.

In some aspects, the Backup Management System 102 may choose more than one Backup Storage. For example, a system may be implemented wherein high priority data is first queued up for transmission to a high speed data center, followed by a transmission of the same high priority data to a second Backup Storage to generate a redundant backup copy. In some aspects, the Backup Management System 102 may have access to two or more network interfaces. In this configuration, two or more transmissions may be sent simultaneously, either to the same or a different Backup Storage. In some aspects, the Backup Management System 102 may select two separate Backup Storage, partition the queue of Backup Data Items, and transmit the Backup Data Items to both locations simultaneously in order to expedite the backup process.

The Backup Storage may be selected using various methods, based upon the preferences and needs of the user or enterprise:

According to one aspect, the Backup Storage may be chosen based on a correspondence of the Danger Level and Data Importance Level pair and availability or selection of an appropriate Backup Storage. For example, the following table of correspondences may be used to choose a Backup Storage:

|  | Importance | | |
| --- | --- | --- | --- |
| Danger | Low Importance | Normal Importance | High Importance |
| Low Danger Level | Storage 1 | Storage 1 | Storage 2 |
| High Danger Level | Storage 3 | Storage 3 | Storage 4 |

According to another aspect, the Backup Storage may be chosen using a script, which selects the Storage based on Danger Level and Data Importance Level and some additional logic. For example, when the Danger Level is Low, the system may backup all data to the nearest Backup Storage; whereas when the Danger Level is High, the system may backup data with high importance to the Backup Storage in another region and data with low importance to the nearest Backup Storage.

It should be appreciated that the system 100 may be used not only for backup process management but also for other tasks that require complex decision-making based on multiple factors, including but not limited to the emergency and danger factors described herein.

FIG. 1. illustrates a block diagram of a system that may be used to implement the automatic data backup methods disclosed herein. The system, in a general aspect, comprises a Backup Management System, a System To Back Up 105 and one or more Backup Storage units or locations. The Backup Management system 102 further comprises a Backup System 103 configured to communicate with a Danger Level Monitor 101 and a Storage Selector 106. The System to Back Up 105 comprises a plurality of Backup Data Items, each assigned a given importance level. The Backup System may be configured to arrange for and initiate a backup operation to one or more Backup Storage units/ locations upon the detection of one or more triggering events. A queue of Backup Data Items may be arranged based upon any of the priority rules and algorithms described herein, resulting in the Backup System queueing Backup Data Items for transmission as part of a Backup Job 108. Thereafter, the Backup Data Items copied from the System To Back Up 105 are transferred to the one or more Backup Storage units/locations. As discussed herein, any of the individual elements may be present as a plurality or modified according to the various embodiments described in the present disclosure.

Figure 2:
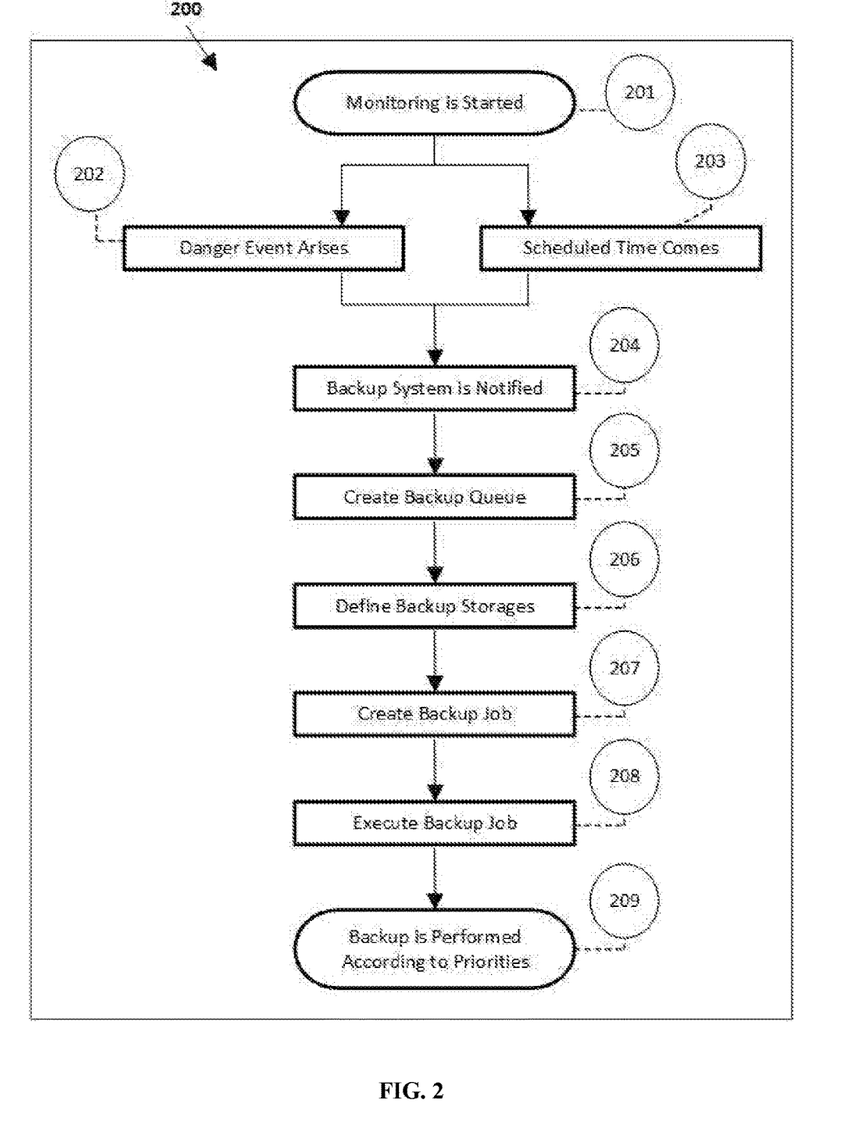
FIG. 2 is a flow diagram illustrating an exemplary method for automatic data backup based on multi-factor environment monitoring.

FIG. 2 illustrates a flowchart of an exemplary method for automatic data backup based on multi-factor environment monitoring according to the present disclosure. This exemplary method 200 may be implemented by the system 100 of FIG. 1. At step 201, the system 100 monitors for occurrence of one or more danger events. At steps 202 and 203, the system 100 determines whether one of the monitored danger event occurs (or about to occur) and/or when a scheduled backup time occurs. At step 204, when the monitored danger event occurs (or about to occur) and/or when a scheduled backup time occurs, the system 100 notifies a backup system and initiates a data backup process. During the backup initiation process, the system 100 determines a danger level of the detected danger event; determines an importance level of each of a plurality of backup data items; determines a backup time for performing backup of the backup data items based on the determined danger level of detected danger event; and determining a backup order of the plurality of backup data items based on the determined importance level of the backup data items. Next, at step 205, the system 100 creates a backup queue of backup data items based on the determined backup time and backup order of the plurality of backup data items. At step 206, the system 100 selects a backup storage for the backup data items based on the danger level of the danger event and the importance level of the backup data item. At step 207, the system 100 generates backup job for each backup data item in the queue based on the selected backup storage for said backup data item. Lastly, at steps 208 and 209, the system 100 performs a backup of the plurality of backup data items to the selected backup storage in the determine backup order (i.e., based on priorities of backup data items) and at the determined backup time. As described herein, the backup system notification step may be triggered based upon various combinations of the danger level and scheduling, as required to suit the needs of the user or enterprise.

Figure 3:
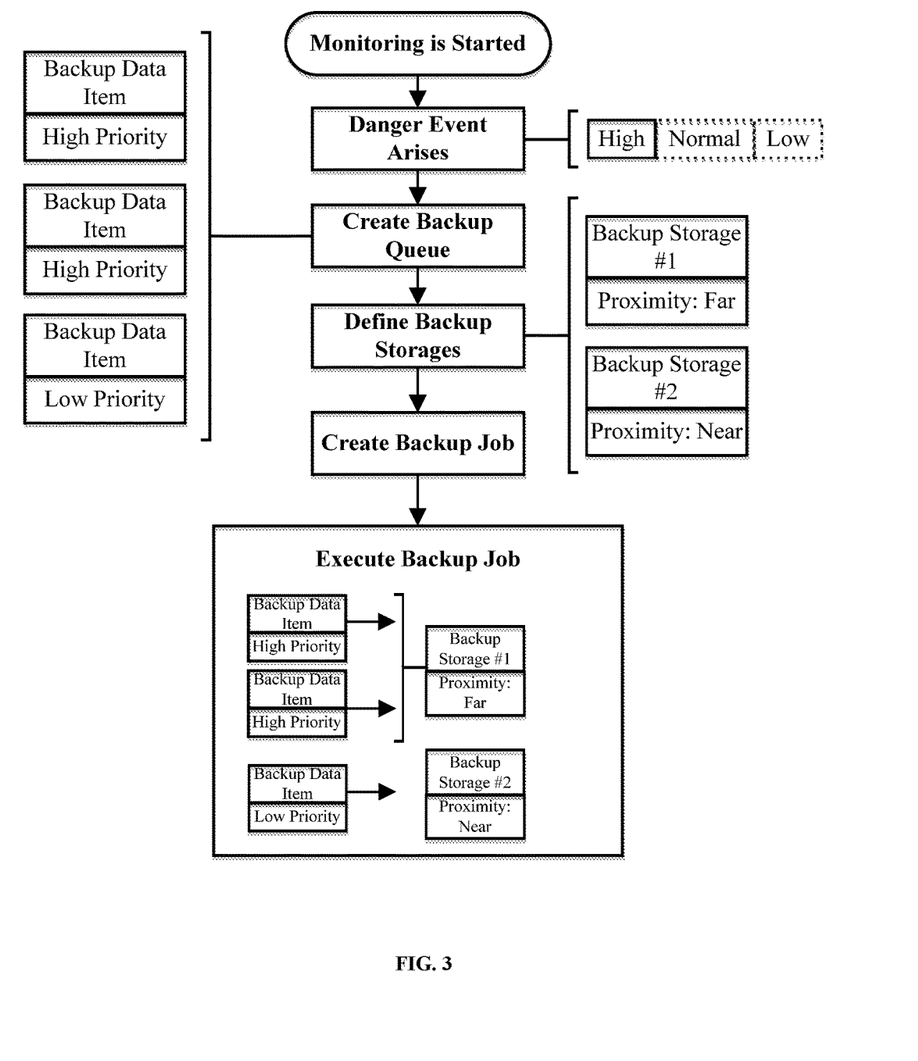
FIG. 3 is a flow diagram illustrating an alternative exemplary method for automatic data backup based on multi-factor environment monitoring.

FIG. 3 depicts a flow diagram showing an alternative exemplary method for automatic data backup based on multi-factor environment monitoring. In particular, this aspect describes an implementation similar to the one described in [0043] above. In this aspect, a Backup Storage location is chosen based upon a combination of the Danger Level and the proximity of the Backup Storage. As shown by the figure, the Danger Level is presumed to be "high" in this example. After monitoring has detected a high danger event, a backup queue is assembled and Backup Storage locations are evaluated. In this hypothetical example, the policy in effect requires transmission of high priority Backup Data Items to a distant Backup Storage and transmission of low priority Backup Data Items to the nearest Backup Storage. In many situations, a geographically closer data center or server will tend to provide higher available bandwidth. However, if a danger event is able to generate a high danger level locally, it is good practice to backup any high priority data to a more distant Data Storage location, in case nearby Backup Storage locations are also affected by the danger event As shown by FIG. 3, because of the high danger level detected, high priority Backup Data Items are transmitted to Backup Storage #1, which is further away from the local Backup System than Backup Storage #2. Low priority Backup Data Items, in contrast, are transmitted to nearby Backup Storage #2.

Figure 4:
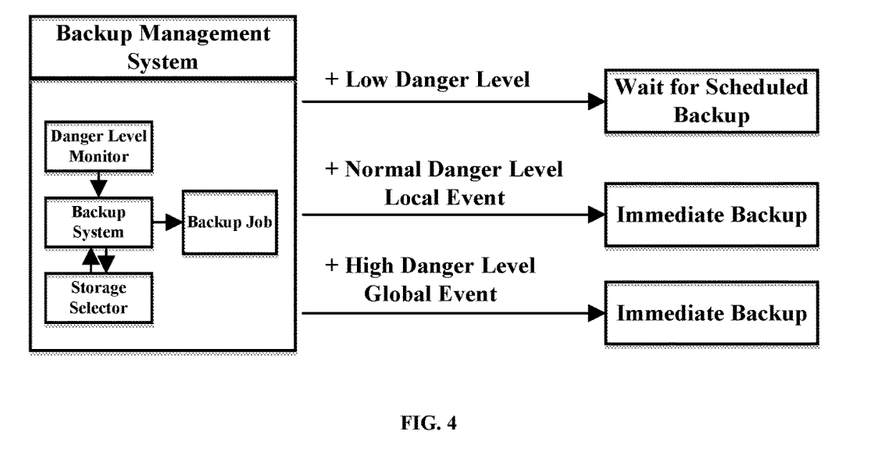
FIG. 4 is a block diagram illustrating an alternative exemplary method for automatic data backup based on multi-factor environment monitoring.

FIG. 4 is a block diagram illustrating an alternative exemplary method for automatic data backup based on multi-factor environment monitoring. In particular, this figure illustrates an aspect similar to the "Complex Configuration" described in [0030]. In this case a low Danger Level triggers the Backup System to hold off on any immediate transfers and wait for a regularly scheduled backup. Immediate backups, however, may be triggered either by a normal Danger Level local event or by a high Danger Level global event. As described herein, more complex policies may be put into place dependent on user or enterprise input, a default configuration file or any other source.

Figure 5:
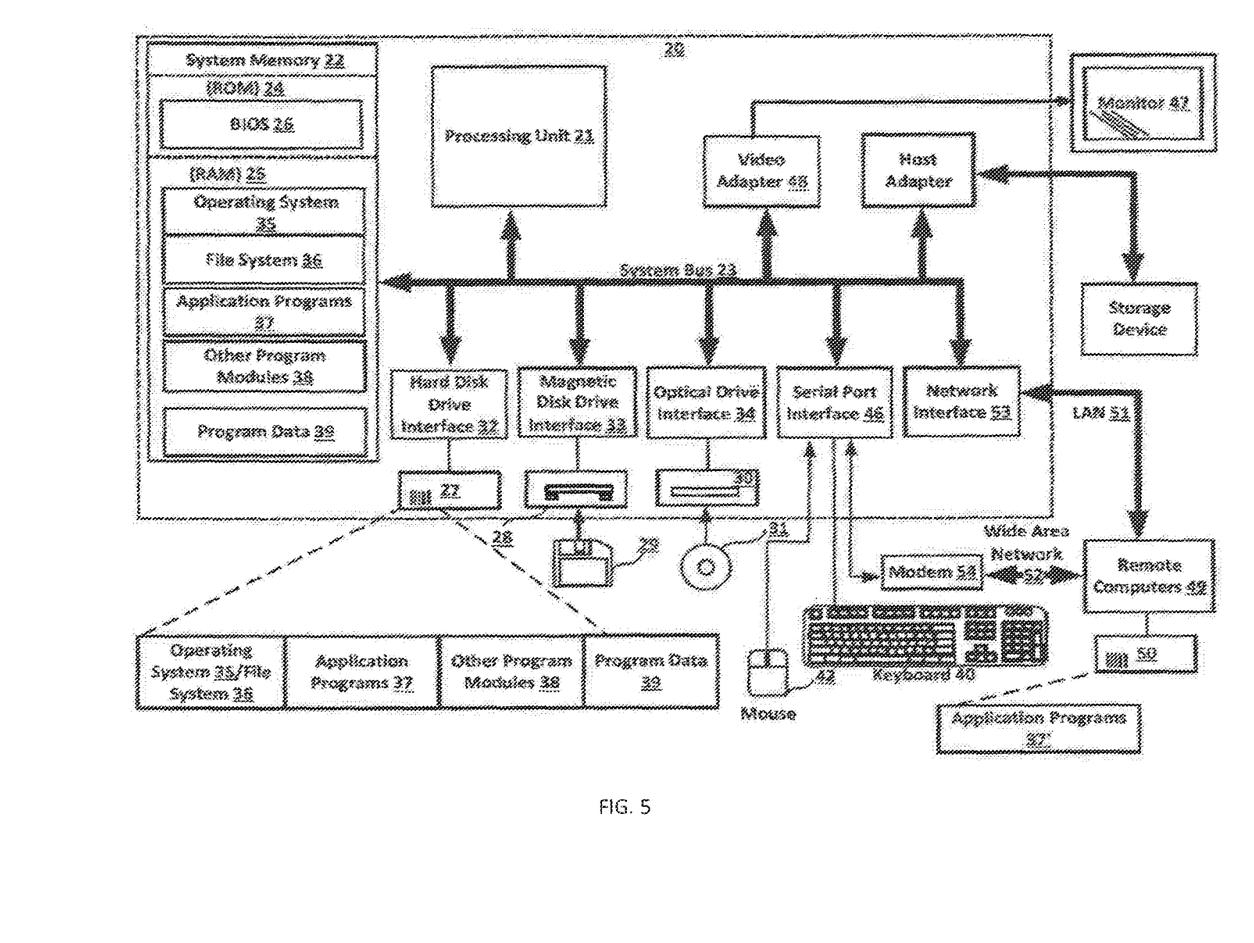
FIG. 5 is a diagram illustrating an exemplary general-purpose computer system on which the disclosed systems and methods for automatic data backup based on multi-factor environment monitoring may be implemented.

FIG. 5 depicts one example aspect of a computer system 5 that may be used to implement the disclosed system and method for performing data backup. The computer system 5 may include, but not limited to, a personal computer, a notebook, tablet computer, a smart phone, a mobile device, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the modules of computer system 5, such as during start-up. RAM 23 stores operating system 24 (OS), such as Windows® 7 Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a display 60 or other video reproduction device, such as touch-screen display. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

The terms "component" and "module" as used herein mean a real-world device, apparatus, or arrangement of components or modules implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A component or module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 below). Accordingly, each component or module can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for performing data backup, the method comprising:
   monitoring, by a hardware processor, for an occurrence of one or more danger events;
   detecting, by the hardware processor, when a danger event occurs;
   determining, by the hardware processor, a danger level of the detected danger event;
   determining, by the hardware processor, an importance level of each of a plurality of backup data items;
   determining, by the hardware processor, a scheduled backup time for performing a backup of the backup data items based on the determined danger level of the detected danger event;
   determining, by the hardware processor, a backup order of the plurality of backup data items based on the determined importance level of the backup data items;
   selecting, by the hardware processor, a backup storage for the backup data items based on the danger level of the danger event and the importance level of the backup data item;
   in response to the danger level being below a predetermined low threshold, performing, by the hardware processor, a backup of the plurality of backup data items to the selected backup storage in the determined backup order and at the scheduled backup time, and
   in response to the danger level being above a predetermined high threshold, performing an immediate backup of the plurality of backup data items to the selected backup storage in the determined backup order.

2. The method of claim 1, wherein the danger event is selected from a plurality of danger events, including local danger events and global danger events.

3. The method of claim 1 further comprising: generating a queue of backup data items based on the determined backup time and the backup order of the plurality of backup data items.

4. The method of claim 3 further comprising: generating a backup job for each backup data item in the queue based on the selected backup storage for said backup data item.

5. The method of claim 1, wherein the importance level of each of the plurality of backup data items is based at least in part on the file type or metadata of each of the backup data items.

6. The method of claim 1, wherein the backup storage for the backup data items is selected at least in part based upon geographic proximity to the computer containing the backup data items.

7. A system for performing data backup, the system comprising:
   a processor configured to:
      monitor for an occurrence of one or more danger events;
      detect when a danger event occurs;
      determine a danger level of the detected danger event;
      determine an importance level of each of a plurality of backup data items;
      determine a scheduled backup time for performing a backup of the backup data items based on the determined danger level of the detected danger event;
      determine a backup order of the plurality of backup data items based on the determined importance level of the backup data items;
      select a backup storage for the backup data items based on the danger level of the danger event and the importance level of the backup data item;
      in response to the danger level being below a predetermined low threshold, perform a backup of the plurality of backup data items to the selected backup storage in the determined backup order and at the determined backup time, and
      in response to the danger level being above a predetermined high threshold, perform an immediate backup of the plurality of backup data items to the selected backup storage in the determined backup order.

8. The system of claim 7, wherein the danger event is selected from a plurality of danger events including local danger events and global danger events.

9. The system of claim 7, wherein the processor further configured to generate a queue of backup data items based on the determined backup time and the backup order of the plurality of backup data items.

10. The system of claim 9, wherein the processor further configured to generate a backup job for each backup data item in the queue based on the selected backup storage for said backup data item.

11. A non-transitory computer readable medium comprising computer executable instructions for performing data backup, including instructions for:
- monitoring for an occurrence of one or more danger events;
- detecting when a danger event occurs;
- determining a danger level of the detected danger event;
- determining an importance level of each of a plurality of backup data items;
- determining a scheduled backup time for performing a backup of the backup data items based on the determined danger level of the detected danger event;
- determining a backup order of the plurality of backup data items based on the determined importance level of the backup data items;
- selecting a backup storage for the backup data items based on the danger level of the danger event and the importance level of the backup data item;
- in response to the danger level being below a predetermined low threshold, performing a backup of the plurality of backup data items to the selected backup storage in the determined backup order and at the determined backup time, and
- in response to the danger level being above a predetermined high threshold, performing an immediate backup of the plurality of backup data items to the selected backup storage in the determined backup order.

12. The non-transitory computer readable medium of claim 11, wherein the danger event is selected from a plurality of danger events including local danger events and global danger events.

13. The non-transitory computer readable medium of claim 11 further comprising instructions for: generating a queue of backup data items based on the determined backup time and the backup order of the plurality of backup data items.

14. The non-transitory computer readable medium of claim 13 further comprising instructions for: generating a backup job for each backup data item in the queue based on the selected backup storage for said backup data item.

* * * * *